United States Patent Office 3,170,942
Patented Feb. 23, 1965

3,170,942
CHLORINATED ALLYL THIOCYANATES
Llewellyn W. Fancher, Lafayette, Calif., and George P. Willsey, Houston, Tex., assignors to Stauffer Chemical Company, New York, N.Y., a corporation of Delaware
No Drawing. Filed Apr. 12, 1962, Ser. No. 186,836
3 Claims. (Cl. 260—454)

This invention relates to new compositions of matter and their use in controlling microorganisms and nematodes More particularly, the compounds of the present invention are of the formula:

$$Cl_2C=\underset{\underset{X}{|}}{C}-CH_2SCN$$

wherein X is hydrogen or chlorine.

These compounds are produced by reacting the appropriately chlorinated propene with sodium thiocyanate in a solvent media.

The following two examples show in detail the method of making the compounds of the present invention.

EXAMPLE 1.—3-THIOCYANO-1,1,2-TRICHLORO-1-PROPENE (R–4024)

A mixture of 1,1,3-trichloro-1-propene 10.2 g. (0.07 (0.06 M), sodium thiocyanate 8.1 g. (0.1 M) and dimethyl formamide 30 cc., was well stirred then allowed to stand one hour. The reaction was mildly exothermic. The mixture was then warmed on the steam-bath for fifteen minutes to insure completion of the reaction. After cooling, the mixture was diluted with 200 cc. of ice water. The solid which precipitated was filtered off and washed several times with water. After drying in air there was obtained 11.4 g. (93% of theory) of 3-thiocyano-1,1,2-trichloro-1-propene, M.P. 48–49° C. Infrared analysis confirmed the structure as:

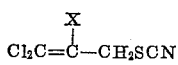

EXAMPLE 2.—3-THIOCYANO-1,1-DICHLORO-1-PROPENE (R–4065)

A mixture of 1,13-trichloro-1-propene 10.2 g. (0.07 M), sodium thiocyanate 8.1 g. (0.1 M) and dimethyl formamide 30 cc., was well stirred then allowed to stand one hour. The reaction was mildly exothermic. The mixture was then warmed on the steam-bath for twenty minutes to complete the reaction. After cooling, the mixture was poured into ice-water whereupon a liquid product separated. The product was extracted with benzene, washed once with cold water and dried over anhydrous magnesium sulfate. After filtering, the filtrate was evaporated on the steam-bath with an air jet to a constant $n_D^{30}$. The liquid product, 3-thiocyano-1,1-dichloro-1-propene, weighed 10.8 g. (91.5% of theory). Infrared analysis confirmed the structure as:

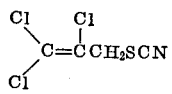

Solvents, other than dimethyl formamide, such as alcohols can be used, but the desired reaction proceeds more slowly. Dimethylacetamide and related inert solvents could most probably be used effectively.

The compounds of the present invention were tested to determine their pesticidal activity as follows:

In vitro test

R–4024 and R–4065 were placed in a number of separate vials of malt broth at varying rates. Next, water suspensions of spores or cells of Aspergillus niger, Penicillium sp., Escherichia coli, and Rhizopus nigricans were added (one organism per vial). One week later results were noted. Aspergillus niger was completely controlled by each compound at 5 p.p.m. which was the lowest concentration tested. Penicillium sp. was partially controlled by R–4024 at 5 p.p.m. and by R–4065 at 10 p.p.m. Rhizopus nigricans was completely controlled by both R–4024 and R–4065 at 50 p.p.m. which was the lowest concentration tested. Escherichia coli was completely controlled by both compounds at 25 p.p.m.

Agar fumigation test

The compounds were then tested to see if they possessed a fungicidal vapor phase.

Approximately 0.1 gram of each compound was placed in 0.5 ml. microbeakers which, in turn, were placed in separate Petri dishes containing hardened potato dextrose agar. Aspergillus niger spores were dusted onto the agar and the dishes were closed. One week later growth of the fungus was recorded as 100% controlled, thus showing the usefulness of compounds R–4024 and R–4065 as fungicidal fumigants.

Soil mix tests

The compounds of the present invention were also tested to see if they were active against soil-borne pathogenic fungi. Here, the compound R–4024 was pipetted into Rhizoctonia solani and Fusarium solani infested soil at varying rates, mixed thoroughly, and then dumped into paper containers. Cotton seeds were then planted into this Rhizoctonia solani infested and treated soil and beans in Fusarium solani infested and treated soil. Three to four weeks later the plants were inspected for disease symptoms. Compound R–4024 partially protected both the Rhizoctonia solani infested and Fusarium solani infested plants at 110 p.p.m. while R–4065 completely protected the plants from both fungi at 110 p.p.m.

Nematocide soil incorporation test

This test determines a chemical's action on root-knot nematodes in the soil.

Methods are similar to the above mentioned soil mix test except that root-knot nematodes are used, the soil is sealed for 48 hours after mixing in the compound under test, and tomatoes are planted after the soil is aired out. If the nematodes survive the chemical treatment, they attack the roots and cause swellings or knots. These are observed four weeks after treatment. R–4024 and R–4065 completely controlled the nematodes at 110 p.p.m.

Bactericide test

In this test, liquified potato dextrose agar is mixed with varying amounts of the compounds under test, placed in a Petri dish, and the mixture is allowed to harden. The surface of the agar is then infested with bacteria, namely Staphylococcus aureus and Erwinia amylovora. One week later results are read. R–4024 completely controlled both bacteria species at less than 5 p.p.m. while R–4065 was equally as active against Erwinia amylovora. R–4065 completely controlled Staphylococcus aureus at 10 p.p.m.

The foregoing examples are not to be construed as limits on the present invention. The appended claims are to be construed as the only limits of the present invention.

We claim:
1. A compound of the formula:

$$Cl_2C=\underset{\underset{X}{|}}{C}CH_2SCN$$

wherein X is selected from the group consisting of hydrogen and chlorine.
2. 3-thiocyano-1,1,2-trichloro-1-propene.
3. 3-thiocyano-1,1-dichloro-1-propene.

References Cited in the file of this patent
UNITED STATES PATENTS

| | | |
|---|---|---|
| 2,650,240 | Olin | Aug. 25, 1953 |
| 2,855,339 | Klopping | Oct. 7, 1958 |
| 2,954,393 | Haimsohn et al. | Sept. 27, 1960 |
| 2,972,561 | Suhovecky et al. | Feb. 21, 1961 |

OTHER REFERENCES

Soderback: Ann. der Chem. 443, 142–153 (1925).